No. 749,017. PATENTED JAN. 5, 1904.
E. H. BELDEN.
ELECTRIC ARC LAMP.
APPLICATION FILED AUG. 6, 1900. RENEWED MAY 11, 1903.
NO MODEL. 5 SHEETS—SHEET 1.

WITNESSES:
Adelaide Kearns.
Augusta Viberg.

Edward H. Belden INVENTOR
BY Chapin & Denny
His ATTORNEYS.

No. 749,017. PATENTED JAN. 5, 1904.
E. H. BELDEN.
ELECTRIC ARC LAMP.
APPLICATION FILED AUG. 6, 1900. RENEWED MAY 11, 1903.
NO MODEL. 5 SHEETS—SHEET 2.

WITNESSES: Edward H. Belden INVENTOR
Adelaide Kearns.
Augusta Viberg. BY Chapin & Denny
His ATTORNEYS.

No. 749,017. PATENTED JAN. 5, 1904.
E. H. BELDEN.
ELECTRIC ARC LAMP.
APPLICATION FILED AUG. 6, 1900. RENEWED MAY 11, 1903.
NO MODEL. 5 SHEETS—SHEET 3.
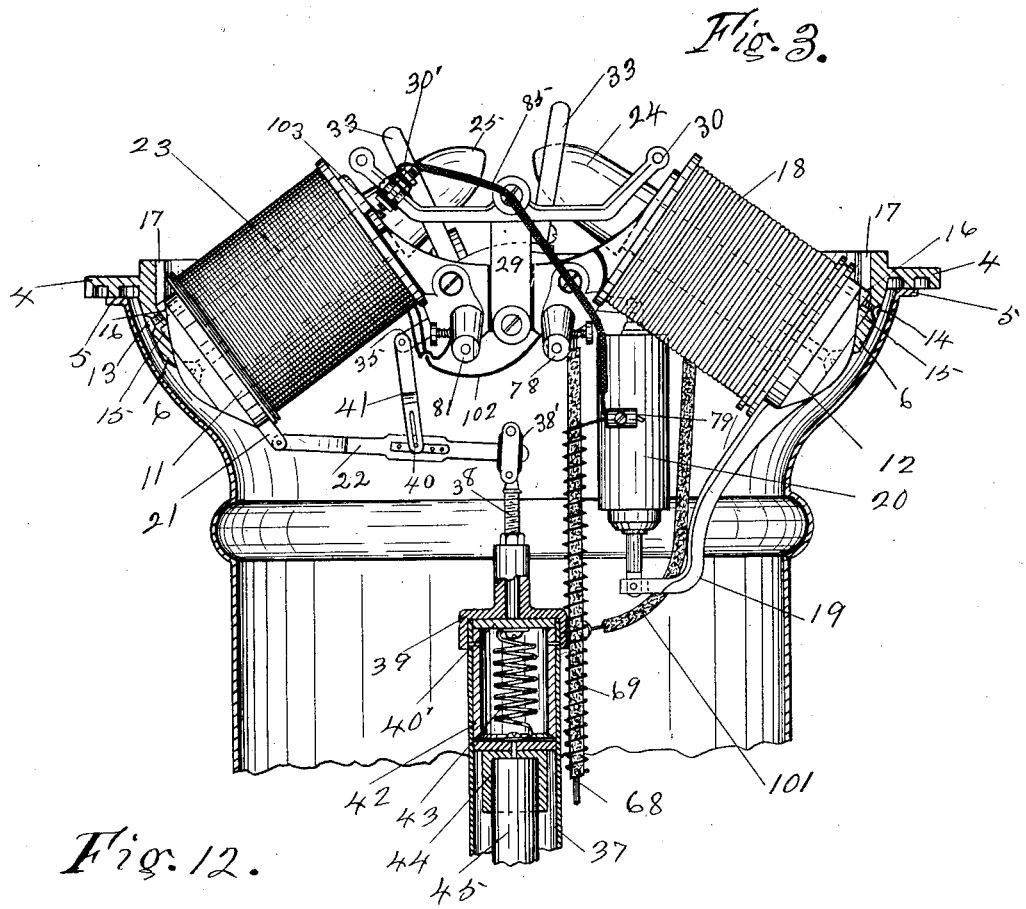
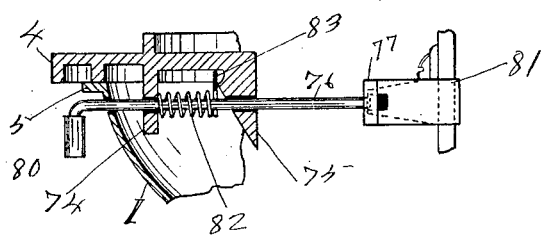
WITNESSES: Edward H. Belden INVENTOR
Adelaide Kearns.
Augusta Viberg. BY Chapin & Denny
HIS ATTORNEYS.

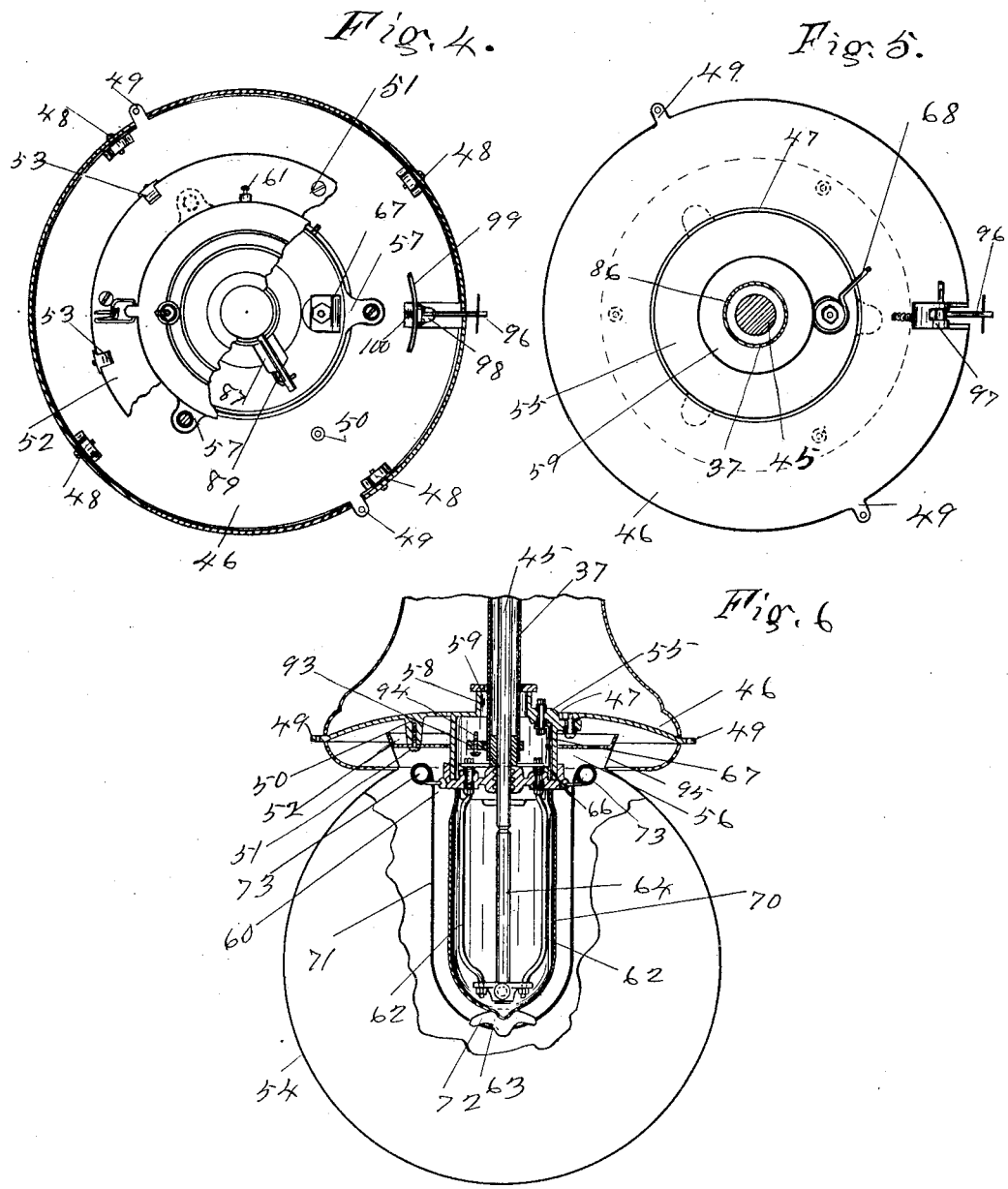

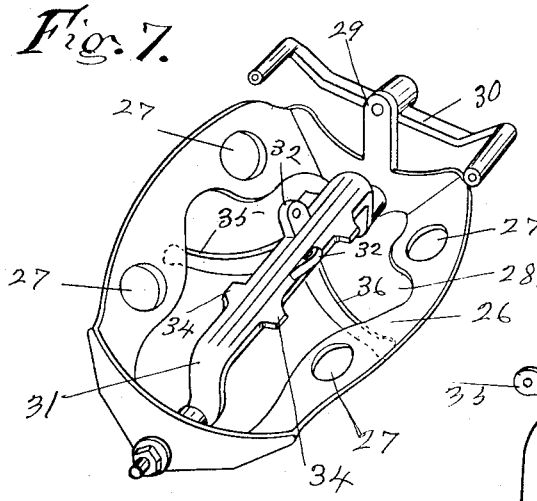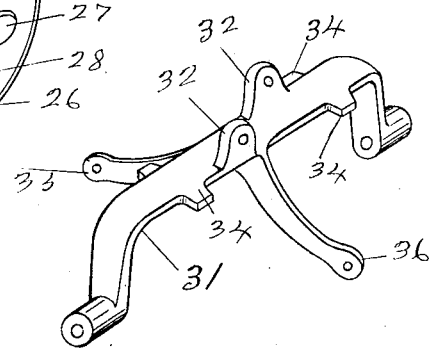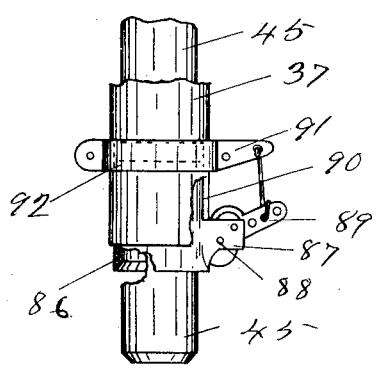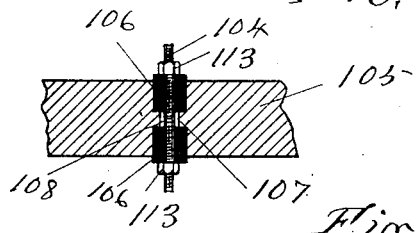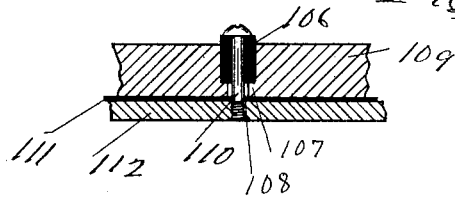

No. 749,017. Patented January 5, 1904.

UNITED STATES PATENT OFFICE.

EDWARD H. BELDEN, OF FORT WAYNE, INDIANA, ASSIGNOR TO WESTINGHOUSE ELECTRIC & MANUFACTURING COMPANY, A CORPORATION OF PENNSYLVANIA.

ELECTRIC-ARC LAMP.

SPECIFICATION forming part of Letters Patent No. 749,017, dated January 5, 1904.

Application filed August 6, 1900. Renewed May 11, 1903. Serial No. 156,695. (No model.)

*To all whom it may concern:*

Be it known that I, EDWARD H. BELDEN, a citizen of the United States, residing at Fort Wayne, in the county of Allen, in the State of Indiana, have invented certain new and useful Improvements in Electric-Arc Lamps; and I do hereby declare that the following is a full, clear, and exact description of the invention, which will enable others skilled in the art to which it appertains to make and use the same, reference being had to the accompanying drawings, which form part of this specification.

My invention relates to electric-arc lamps, and more particularly to that class of arc-lamps having inclosed operating mechanisms and closed chambers for the arcs.

The object of my present invention is to provide an inclosed arc lamp of simple and compact construction the operating and controlling mechanism of which shall have such structural characteristics and be so disposed as to permit of ready and convenient assembling and disassembling and also insure satisfactory operation and substantial freedom from liability of injury in service.

My invention is illustrated in the accompanying drawings, in which—

Figure 1:
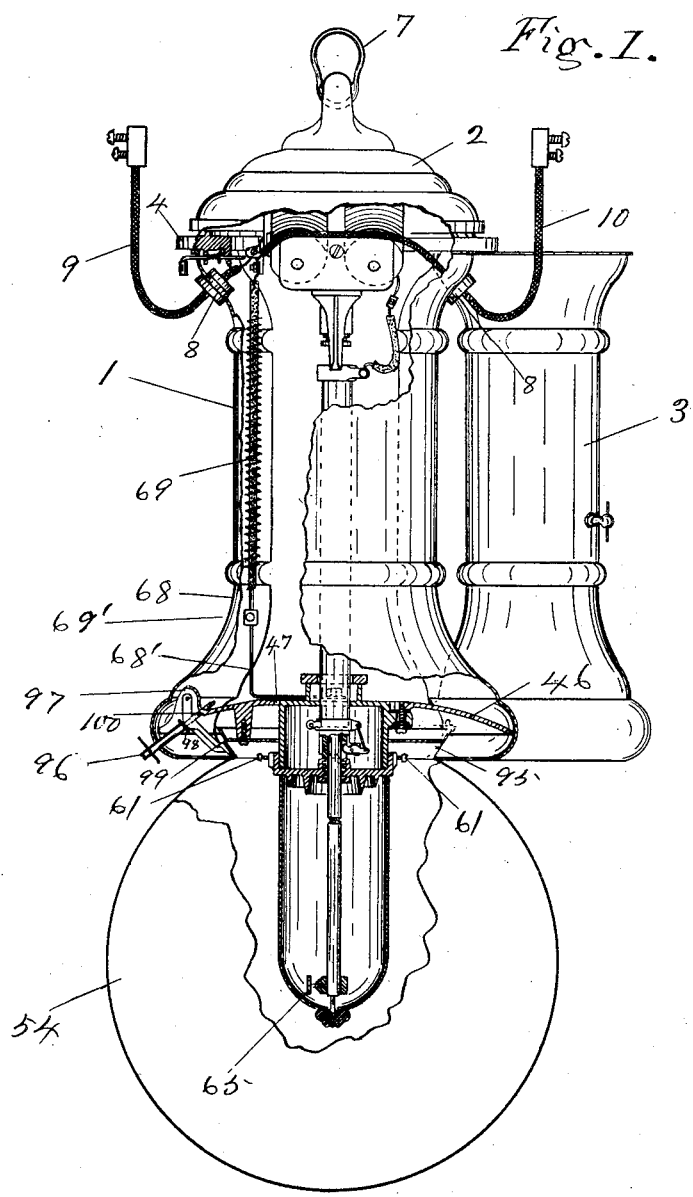
Figure 2:
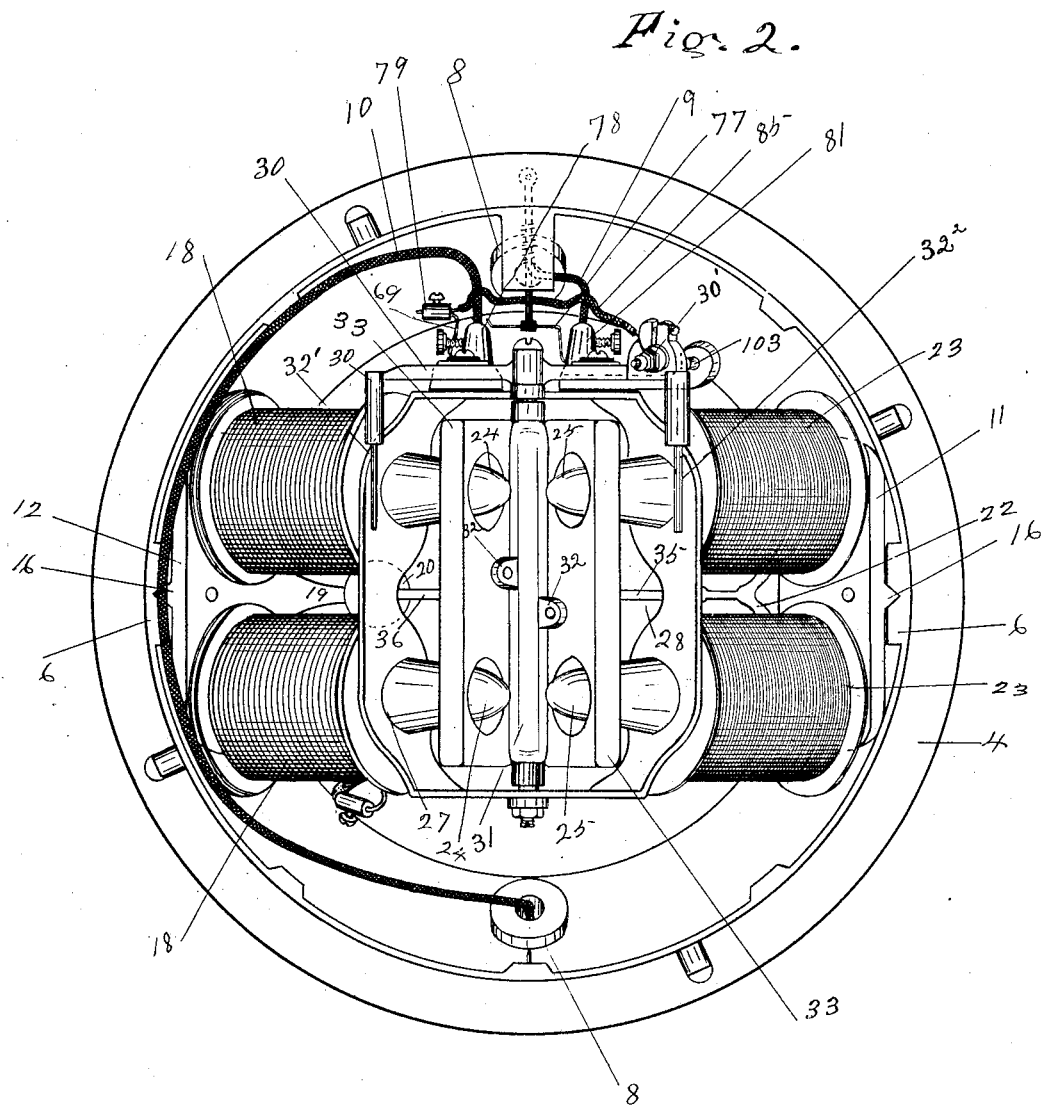

Figure 1 is a side elevation of the lamp with the inclosing casing broken away in part to show the relative arrangement of the operating parts. Fig. 2 is an enlarged plan view of the lamp, the detachable top of the casing being removed. Fig. 3 is a side elevation of the controlling mechanism in position in the upper portion of the casing, which is shown in vertical transverse section with the detachable cap removed. Fig. 4 is a bottom plan view of the lamp with the arc-globes and hanger-brackets removed, parts being broken away. Fig. 5 is a top plan view of the mechanism in the lower part of the lamp, with the lower carbon in cross-section. Fig. 6 is a vertical section of the lower portion of the lamp, taken at right angles to the section shown in Fig. 1. Fig. 7 is a perspective detail view of the rocking support for the armature and cut-out, showing their relative arrangement upon the fixed supporting-frame. Fig. 8 is a perspective detail view of the armature-supporting casting. Fig. 9 is an enlarged detail view of the clutch mechanism in position on the guiding-tube with the movable carbon shown therein. Figs. 10 and 11 are detail views, in vertical section, illustrating my improved system of insulation. Fig. 12 is a detail view of a manually-operated cut-out switch.

Referring now more particularly to Figs. 1, 2, and 3 of the drawings, the casing 1 is formed of sheet metal and is of generally cylindrical form, but is flaring in contour at each extremity, as shown. Its top is closed by a detachable cap 2 and its bottom by a concave base-plate, to be hereinafter described. Convenient access to the interior of said casing is afforded by one or more, preferably two, vertically-arranged hinged doors 3. The casing is also provided in its upper portion with bushings 8 for the leading-in wire 9 and the leading-out wire 10. Interposed between the top of the casing 1 and the cap 2 is a ring 4, which is rigidly secured to a horizontal flange 5 by means of proper holding screws or bolts. The ring 4 is provided at diametrically opposite points with pendent integral plates 6, having vertical grooves 17 to receive corresponding lugs 16 on the castings 11 and 12, to be hereinafter described. The cap 2 has an insulated metallic link 7, by means of which it is suspended, and it is secured to the casing by any suitable means. (Not shown.) From the ring 4 all the controlling mechanism of the upper portion of the lamp is supported as follows: To the inner faces of the respective plates 6 are rigidly fixed the pendent inclined castings 11 and 12 by means of holding-screws 13 and 14, and said castings are further secured against lateral displacement by the engagement of the two lugs 15 and 16 with the vertical grooves 17 in said plates 6. To the inner faces of the pendent castings 11 and 12 are firmly bolted or otherwise secured the respective magnet-coils 18 and 23. The casting 12, to which the series-coils 18 are secured, has a downwardly and inwardly extending arm 19, to the lower end of which the plunger of a dash-pot 20 is secured. The shunt-coils 23 are rigidly attached to the casting 11, the lower edge of which is provided with slotted and apertured lugs 21, to which the outer bifurcated end of a lever 22 is pivoted. The said series and shunt magnets are arranged in inclined positions with their respective pole-pieces 24 and 25 projecting toward and in proximity to each other, as shown in Figs. 2 and 3. To the adjacent ends of the said magnets is rigidly secured a trough-like frame 26, which is open at top and bottom and is provided with lateral openings 27 for the respective protruding ends of the pole-pieces 24 and 25 and has recesses 28 in its lower edges midway of its ends to accommodate the movement of the rocking mechanism to be hereinafter described. The frame 26 is also provided at one end with an upright integral standard 29, on the upper end of which a cut-out member 30 is pivotally mounted. The ends of the frame 26 are provided with bearings for the ends of a curved bar 31, which is provided with upright apertured lugs 32. An armature 33 is rigidly fastened to the lugs 32 and is partially supported by lateral lugs 34, with which the bar 31 is also provided. The bar 31 also has a pair of oppositely-arranged drooping integral arms 35 and 36, to the latter of which the upper end of the cylinder of the dash-pot 20 is pivotally connected and to the former of which the upper end of the upper-carbon-guide tube 37 is connected, as will be hereinafter described. As here shown, the armature 33 comprises two plates which are secured to the lugs 32 and are provided with lateral openings to admit without contact the extended ends of the said pole-pieces 24 and 25. Inasmuch as the plates 33 are rigidly fastened to the bar 31, the said parts may be regarded as constituting a single structure, which may be considerably modified as regards form, dimensions, and structural composition without departing from my invention. The cut-out member 30, pivoted as described, has a walking-beam motion and is provided upon its opposite ends with the armatures 32' and 32², which project at right angles thereto, as shown. One end of a flexible conductor 85 is connected to the member 30 at 31', and its other end is secured to a connector 79, to which the upper end of a resistance-coil 69 is also secured.

In Fig. 12 is shown a manually-operated cut-out switch, which is constructed and arranged as follows: At a suitable point on the inner edge of the ring 4 are located two lugs 74 and 75, having alined openings through which projects a rod 76. This rod also projects loosely through an opening in the casing 1, and its outer end is provided with a handle 76ª. The inner end of said rod is provided with an insulated spring-plate 77, one end of which is secured to the positive binding-post 81 and the other end of which is normally out of contact but in close proximity to the negative binding-post 78. (See Fig. 2.) The rod 76 is surrounded by a spiral spring 82, one end of which bears against the lug 74. The other end of the spring bears against a pin 83, which projects through the rod and bears against the inner inclined face of the lug 75. Obviously when the said switch-rod 76 is rotated sufficiently to permit the extended end of the pin 83 to escape its bearing on the lug 75 the switch-rod will be pushed forward by the spring 82 and will thus force the free end of the spring 77 into contact with the negative binding-post 78, thereby short-circuiting the two binding-posts and cutting out the lamp.

The lever 22 is fulcrumed at its bifurcated end to the ears 21 and is pivotally connected at its other end to the top 39 of the guide-tube 37 by means of the adjustable link 38 and is insulated therefrom, as shown at 38'. The lever 22 is provided intermediate its ends with a set of perforations to receive a pin 40, which connects said lever to one end of a link 41. The lower end of the said link is bifurcated to receive the lever 22 and is provided with a slot for the pin 40. The upper end of the link is pivotally connected to the free end of the arm 35 of the armature-bar 31. The slot in the lower end of the link 41 permits a limited upward movement of the guide-tube incident to inserting the carbons without derangement of the controlling mechanism connected to said link, and the series of perforations in the lever 22 permit a proper adjustment of the link 41 to vary the leverage.

The carbon-guiding tube 37 has a detachable cap 39 and contains a fixed inner sleeve 42, forming a chamber for the flexible wire 43, which is helically coiled therein and has its respective ends secured to a plate 40', fixed in said cap and to the carbon-holder 44, thereby forming an electrical connection between the carbon-guiding tube and the upper carbon 45, which is securely clamped in the holder 44. The carbon-holder 44 is movably mounted in the tube 37 and is limited in its upward movement by the sleeve 42.

The mechanism in the lower part of the lamp-casing 1 (shown in Figs. 1, 4, 5, and 6) is as follows: A convex base-plate 46, having a circular central opening 47, is provided upon its perimeter with a plurality of laterally-apertured pendent lugs 48, adapted to receive holding-screws by means of which the casing is rigidly secured thereto and has a pair of apertured ears 49, to which the casing-doors 3 are hinged. The plate 46 also has a plurality of pendent lugs 50, adapted to receive the holding-screws 51, by means of which a flanged plate 52 is secured in a horizontal position below the plate 46. The plate 52 has a central opening of approximately the same diameter as the one in the plate 46 and has a plurality of fixed peripheral spring hanger-brackets 53, from which the open-top glass globe 54 is suspended. The flaring flange 95 of the globe 54 is placed within the holding-brackets 53 and is then firmly secured in position by an adjustable clamp consisting of a thumb-screw 96, whose screw-threaded inner end is mounted in a lug 97 on the plate 46 and has a fixed collar 98, between which and the adjacent face of the said lug are loosely arranged a spring-metal clamp 99 and a coil-spring 100. By screwing in the thumb-screw the clamp 99 is moved inwardly against the action of the spring 100, and consequently when the thumb-screw is unscrewed the spring will force the clamp away from the globe and release the same.

Located in the circular openings in the plates 46 and 52, but separated from the edges by annular air-spaces 47 and 56, is a cylindrical casting 55, said casting being rigidly secured to the lower face of the plate 46 by means of proper screws and lugs 57, which are insulated from plate 46 in the manner to be hereinafter described. The casting 55 is open at its lower end, and its upper end is provided with a reduced cylindrical extension 58, which is closed by a cap 59, having a central opening to loosely receive the carbon-tube 37. The cap 59 rests loosely in position, and the opening therein is of sufficient diameter to leave an annular outlet adjacent to tube 37 for the escape of gases formed by the arc. The bottom of the casting 55 is closed by a cap 60, which is secured in position by set-screws 61 and has a central opening to loosely receive the movable carbon 45. It has also two insulated openings, in which are secured the upper ends of the lower-carbon bracket, consisting of wires 62 and a cross-plate 63, having a central opening for the lower end of the lower carbon 64, which is secured therein by means of a thumb-screw 65. The upper ends of the wires 62 are electrically connected by means of a transverse plate 66, having one end thereof upturned and arranged to rest in contact with a pendent rod or plate 67, the upper end of which passes through an insulated opening in the top of the casting 55 and is electrically connected to a wire 68, the upper end of which is secured to the negative binding-post 78. The wire 68 is provided with a sheath of insulating material, around which is coiled the resistance-wire 69, the lower end of said resistance-wire being connected to the wire 68 and its upper end being connected to the wire 85, as hereinbefore stated.

A glass globe 70 of proper contour incloses the arc and the lower-carbon bracket, forming an air-tight chamber. This globe is secured in position by a novel form of spring-hanger bracket 71, consisting of a single piece of wire carrying upon its lower end a detachable concave disk 72, adapted to support the lower end of the said globe 70 and having its upper ends formed into spring-coils and secured in suitable lugs in the perimeter of the cap 60. This arrangement of the coils 73 avoids the casting of shadows thereby.

The improved clutch mechanism of my lamp is shown in Figs. 1 and 9 and consists of a sleeve 86, loosely and detachably fitted within the lower end of the tube 37 and provided with apertured ears 87, in which is pivotally mounted at 88 an eccentric holding-dog 89. The ears 87 protrude through a longitudinal slot 90 in the tube 37, and the dog also projects through said slot and a corresponding slot in the sleeve 86 and engages the carbon 45. The projecting lever-handle of the dog 89 is connected to a lug 91 on a ring 92 by a link 91ª, said ring being rigidly clamped upon the tube 37. When the tube 37 is lowered to predetermined amount, the upper edge of the gas-cap 60 will engage the lower end of the sleeve 86 and force it upward, thereby disengaging the dog 89 from the carbon and permitting the latter to move downward. When the tube 37 is again elevated, the dog 89 will again automatically engage the carbon and clamp it to the tube. The ring 92 also has a lateral lug 93, which is provided with a set-screw 94 in order to limit the upward movement of the tube 37 by the contact of its upper end with the plate 47, and thereby limit the upward movement of the pin 40 of the lever 22 to a distance slightly less than the length of the slot in the link 41 to avoid all danger of derangement of the regulating mechanism in replacing the carbon.

The pole-pieces 24 and 25 of the magnets 18 and 23 have their inner protruding ends enlarged, as shown, and to their outer reduced ends the brackets 11 and 12 are rigidly fastened by proper holding-screws. As the projecting ends of the pole-pieces are larger than the openings 27 in the frame 26, the tightening of the screws in the said brackets 11 and 12 will firmly clamp the coils in place, and the operating mechanism will all be removably supported as a single structure from the ring 4. The operator or constructor is thus enabled to remove the mechanism from the said casing as one piece by merely removing the screws 13 and 14. As the pole-pieces 24 and 25 and the rocking armature are mounted upon the same supporting-frame 26, the necessity for mechanical work on these parts to secure accuracy of adjustment is obviated, all danger of derangement in use is avoided, and compactness and simplicity of construction are secured. The arrangement of the pole-pieces to face each other permits the convenient use of the walking-beam cut-out member and enables gravity to assist the movement of the armature as it recedes from its perpendicular position in either direction. The walking-beam cut-out member performs the function of cutting out the lamp in case of excessive voltage, which increases the power of the shunt-magnet, so as to close the cut-out path at 103. (See Fig. 3.)

In Figs. 10 and 11 I have illustrated the improved method of insulation employed in my lamp, which may be briefly described as follows: When it is desired to insulate a rod, bolt, or other part 104, which passes through a plate or other metallic part 105, the opening for said rod is made of somewhat greater diameter than the part to be inserted therein, which opening is then counterbored from each end thereof to receive the cylindrical insulating-bushings 106, which are separated by an annular flange 107 and also by an annular air-space 108, which surrounds the said rod between the said bushings. (See Fig. 10.) When it is desired to insulate two adjacent plates or parts which are fastened together by bolts or screws, the opening through one plate 109 is made of larger diameter than the screw 110. The outer end of this opening is counterbored to contain the cylindrical insulating-bushing 106, and the plates or parts 109 and 112 are separated by means of sheet insulation 111, having an opening for the inner end of the said screw which is secured in the said plate 112. An annular air-space is thus provided around the screw between the two insulations. One great advantage of my form of insulation is that should one of the cylindrical bushings 106 get broken or shattered by the pressure of the screw 110 or the nuts 113, as often occurs in practice, it cannot be displaced, as it snugly fits the said counterbore.

The operation of my improvement thus described may be briefly stated as follows: The current entering the lamp at the positive binding-post 81 passes through the series coils to the top 39 of the guide-tube through the wire 101 and thence to the upper carbon 45 through the wire 43, the lower carbon 64, the bracket 62, the conductor 66, spring connection 67, and wire 68 to the negative binding-post 78, forming path No. 1 of the current through the lamp. The second path for the current is from the positive binding-post through the automatic cut-out and the flexible connection 85, through the resistance 69 and the negative wire 68 to negative binding-post 78. This path is only closed when there is no current in the lamp, the said cut-out at such times resting by gravity upon the positive binding-post. The third path is from the positive binding-post through the shunt-coils and wire 102 to the negative binding-post. When the current enters the lamp, it passes simultaneously through the first and second paths, the resistance 69 in the second path forcing sufficient current through the first path to actuate the armature 32' on the rocking cut-out member 30, thereby breaking the second path at 103. This allows the full current to pass through the first path, thereby actuating the rocking armature 33, which, through the medium of the intermediate mechanism, raises the upper carbon and forms the arc. The resistance of the arc forces current through the third path in proportion to the length of the arc, thereby enabling the operator to so adjust the controlling mechanism of the lamp that the strength of the shunt-magnets will counterbalance that of the series magnets.

Of course the action of the shunt-magnets upon the armature 33 is identical with that of the series magnets, except that they actuate it in the opposite direction, thereby forming the proper arc and maintaining it as follows: As the carbons burn away the resistance of the arc is of course increased, which forces more current through the shunt-magnets or third path, thereby actuating the armature in such a manner as to lower the upper carbon, which action continues as the carbons burn away until the said carbon-clutch strikes the cap 60, thereby releasing the carbon-clutch and permitting the descent of the carbon by gravity. This weakens the shunt-magnets sufficiently to permit the series magnets to raise the clutch until it again engages the carbon and continues to raise the carbon until the proper arc is formed. This action of the controlling mechanism is continued during the life of the carbons.

Having thus described my invention and the manner of utilizing the same, what I desire to secure by Letters Patent is—

1. In an arc-lamp, the combination with series and shunt coils mounted upon a stationary support and having pole-pieces which project toward each other, of an interposed rocking armature pivotally mounted upon said support between said coils and provided with lateral openings to admit the adjacent and respective ends of the said pole-pieces, whereby the sensitiveness of the controlling mechanism is augmented by the tendency of the shunt-field to neutralize the influence of the series field by reversing the polarity of that portion of the armature which moves in the series field.

2. In an arc-lamp, the combination with series and shunt coils mounted upon a fixed support and having pole-pieces which project toward, and into proximity to, each other, of an interposed rocking armature pivotally mounted upon said support and having lateral openings to receive the adjacent and respective pole-pieces, whereby gravity aids the weaker field in actuating the said armature, and whereby the influence of the series field is partially neutralized as the armature approaches the shunt-field.

3. In an arc-lamp, the combination with series and shunt coils arranged on a fixed support at an angle to each other and having pole-pieces which project toward, and into proximity to, each other, of an interposed rocking armature pivotally mounted upon said support and having lateral openings to receive the adjacent and respective pole-pieces, whereby gravity aids the weaker portion of the fields in actuating the armature and whereby the influence of the series field is neutralized in proportion to the strength of the shunt-field by the tendency to reverse the polarity of the armature which is due to the series field.

4. In an arc-lamp, a trough-like and substantially horizontal frame, in combination with series and shunt coils rigidly supported by said frame and a rocking armature pivoted in said frame intermediate said magnets and under the influence thereof.

5. The combination with a skeleton frame adapted to support the controlling mechanism of an arc-lamp, of series and shunt magnets supported in said frame in inclined positions, and a rocking armature pivoted in said frame in coöperative relation to said magnets.

6. In an arc-lamp, a skeleton frame having inclined sides provided with apertures, and magnets supported by said frame and having pole-pieces projecting toward each other through said apertures.

7. In an arc-lamp, the combination with a frame having inclined sides, and magnet-coils clamped to said sides and having pole-pieces that project into proximity to each other, of an armature pivotally mounted in said frame and carbon-supporting means connected to said armature.

8. In an arc-lamp, the combination with a frame having inclined sides provided with circular openings and magnet-coils provided with cores that project through said openings and have enlarged ends to aid in clamping said coils to the frame, of a carbon-controlling armature pivotally supported in said frame and having openings to receive the projecting ends of the magnet-cores.

9. In an arc-lamp, the combination with a frame having inclined sides and shunt and series magnets clamped to the respective sides and having pole-poieces that project toward, and into proximity to, each other, of a carbon-controlling armature pivotally supported in said frame intermediate said magnets.

10. In an arc-lamp, the combination with a skeleton frame and magnets supported thereby in such positions that their pole-pieces project angularly toward each other, of a carbon-controlling armature pivotally supported in said frame midway between said magnets and a walking-beam cut-out member also pivotally supported by said frame.

11. In an arc-lamp, the combination with a carbon-tube having a vertical slot in its lower end and a ring adjacent thereto, of a sleeve loosely surrounding the movable carbon and having ears projecting through said slot, a clutch-dog pivoted between said ears and a link which loosely connects said dog and said ring.

12. In an arc-lamp, the combination with a tube for the movable carbon having a slot in its lower end and having a lateral projection, of a sleeve loosely surrounding the carbon within the lower end of the tube, a dog pivoted to said sleeve and projecting through the tube-slot, a link connecting said dog to the lateral projection on the tube and electromagnetic means for raising and lowering said tube.

13. In an arc-lamp, a ring-clutch mechanism for feeding the upper carbon comprising a pendent carbon-guiding tube having a slot in its lower end, a sleeve located within the lower end of said tube and having lateral ears that project through said slot, a dog eccentrically pivoted to said ears, and means for loosely connecting said dog to the carbon-guiding tube.

14. In an arc-lamp, the combination with a carbon-tube having a vertical slot in its lower end, of a sleeve located within said carbon-guiding tube and having a part projecting through said slot, a dog pivotally mounted on said projecting part and adapted to automatically engage the carbon, a detachable ring on said tube and a link loosely connecting the dog thereto.

Signed by me at Fort Wayne, Allen county, State of Indiana, this 4th day of August, A. D. 1900.

EDWARD H. BELDEN.

Witnesses:
ADELAIDE KEARNS,
WATTS P. DENNY.